Figure 1:
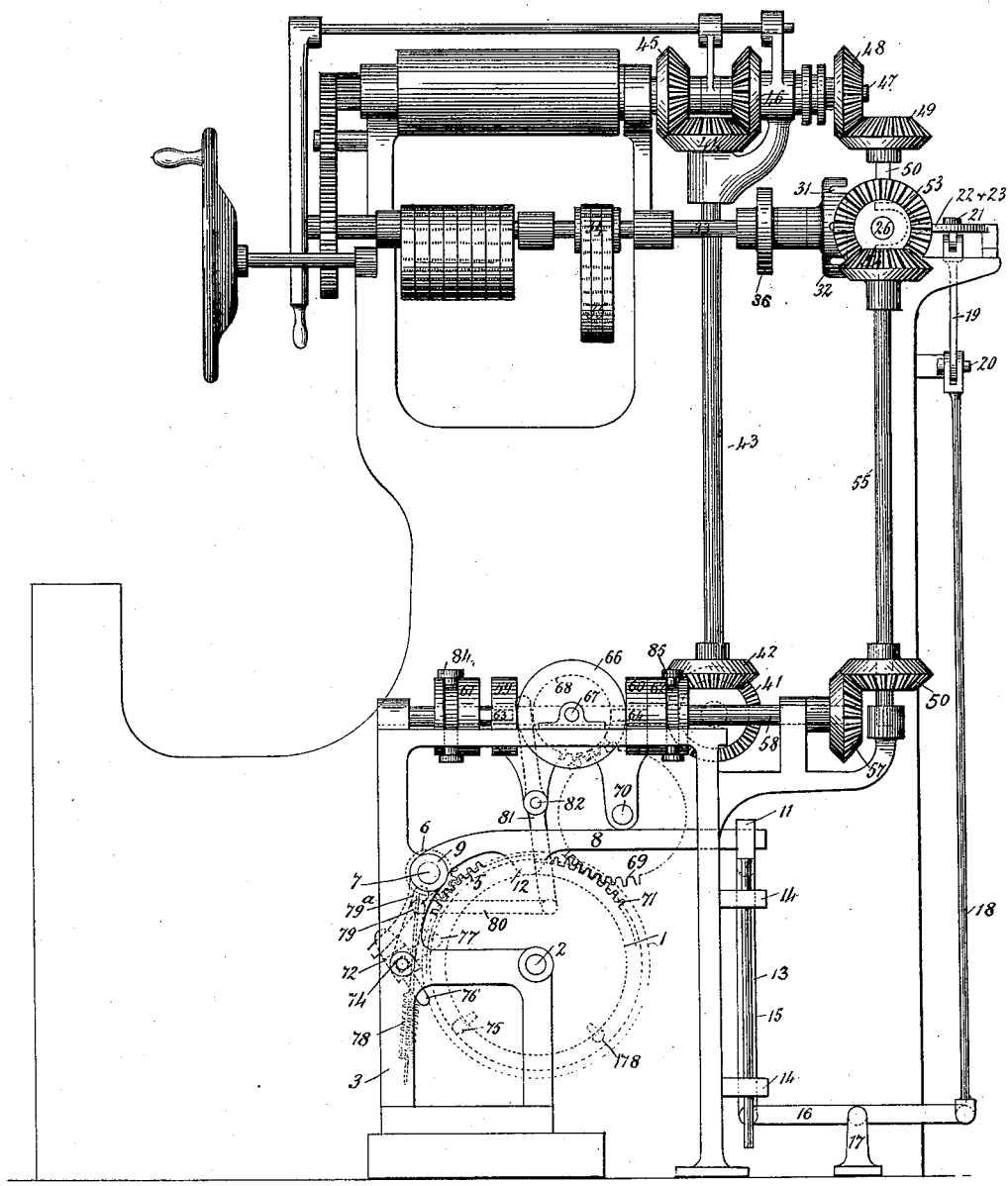

(No Model.) 5 Sheets—Sheet 1.
B. SMITH.
SHUTTLE BOX OPERATING MECHANISM FOR LOOMS.
No. 588,494. Patented Aug. 17, 1897.

Witnesses:
F. W. Wright
Geo. C. Abbe

Inventor
Benjamin Smith
By his Attorneys
Howson & Howson (No Model.)
5 Sheets—Sheet 2.
B. SMITH.
SHUTTLE BOX OPERATING MECHANISM FOR LOOMS.
No. 588,494. Patented Aug. 17, 1897.
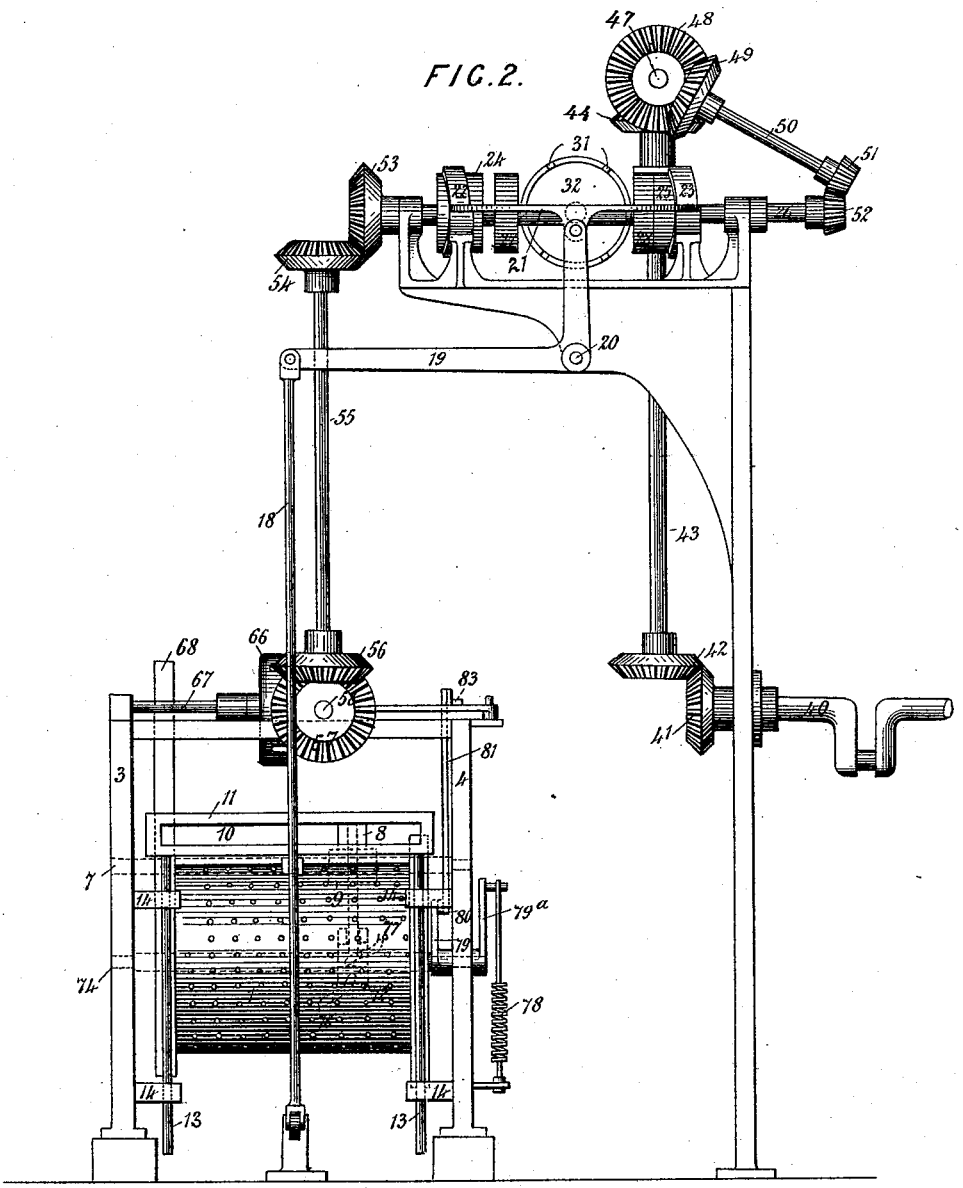

(No Model.) 5 Sheets—Sheet 3.
B. SMITH.
SHUTTLE BOX OPERATING MECHANISM FOR LOOMS.
No. 588,494. Patented Aug. 17, 1897.
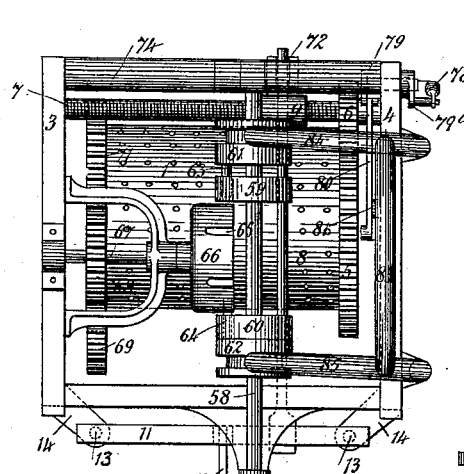
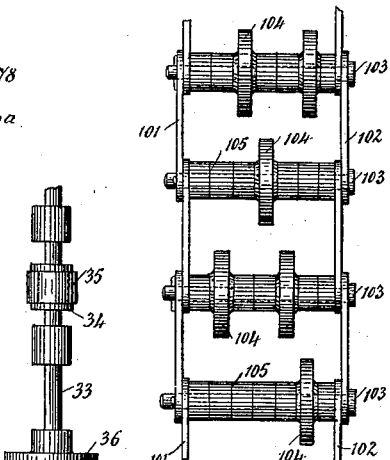
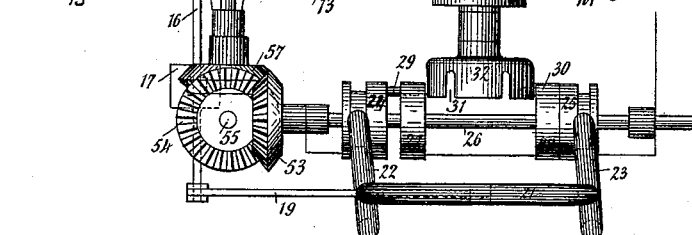
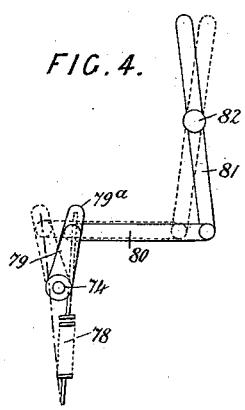
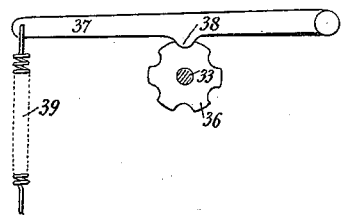
Witnesses:
F. W. Wright
Geo. C. Abb.
Inventor
Benjamin Smith
By his attorneys
Howson & Howson (No Model.) 5 Sheets—Sheet 4.
B. SMITH.
SHUTTLE BOX OPERATING MECHANISM FOR LOOMS.
No. 588,494. Patented Aug. 17, 1897.
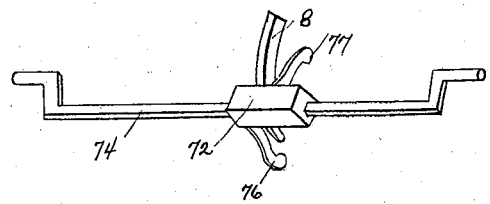
FIG. 6.
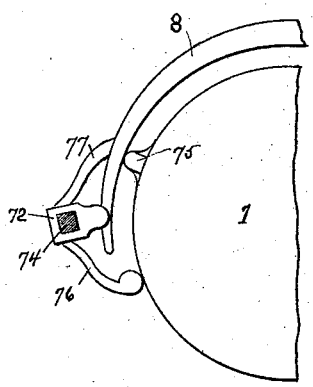
FIG. 6ᵃ.
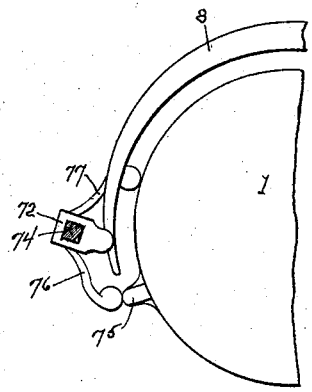
FIG. 6ᵇ.
WITNESSES:
J. W. Wright.
S. C. Connor
INVENTOR
Benjamin Smith
BY
Howson and Howson
ATTORNEYS (No Model.) 5 Sheets—Sheet 5.
B. SMITH.
SHUTTLE BOX OPERATING MECHANISM FOR LOOMS.
No. 588,494. Patented Aug. 17, 1897.
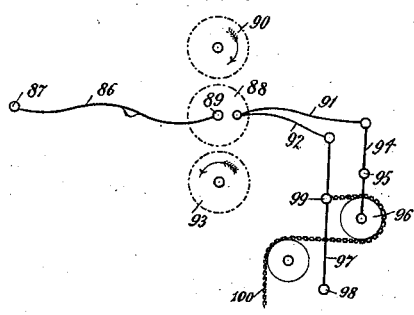
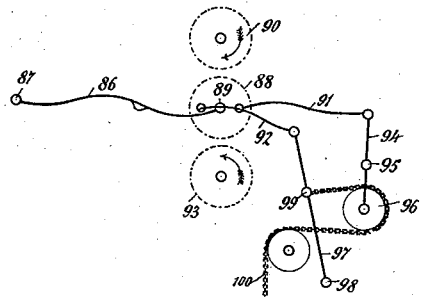
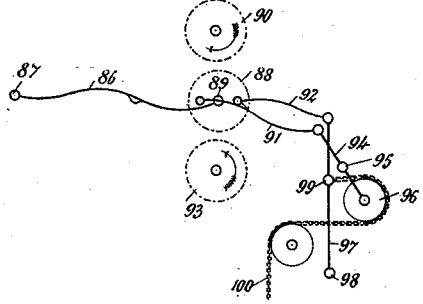
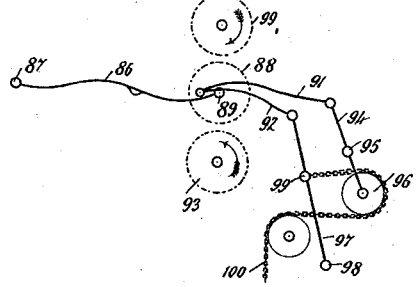
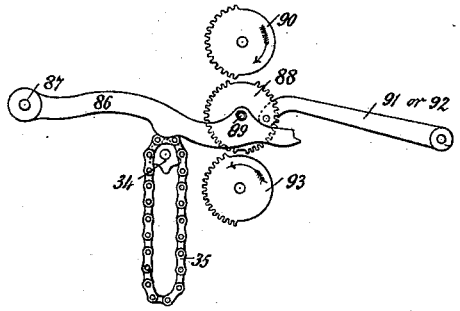
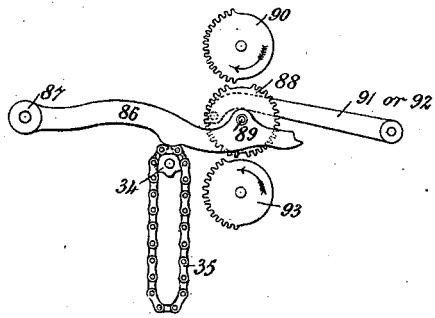

UNITED STATES PATENT OFFICE.

BENJAMIN SMITH, OF PAISLEY, SCOTLAND.

SHUTTLE-BOX-OPERATING MECHANISM FOR LOOMS.

SPECIFICATION forming part of Letters Patent No. 588,494, dated August 17, 1897.

Application filed October 31, 1895. Serial No. 567,533. (No model.) Patented in England December 19, 1894, No. 24,690.

*To all whom it may concern:*

Be it known that I, BENJAMIN SMITH, a subject of the Queen of Great Britain and Ireland, and a resident of Paisley, Scotland, have invented certain Improvements in Shuttle-Box-Operating Mechanism for Looms, of which the following is a specification.

A patent has been obtained for said invention in Great Britain, No. 24,690, dated December 19, 1894.

My invention has reference to power-looms for weaving textile fabrics, and particularly to the mechanism used for effecting the changes in the shuttle-boxes in looms used for weaving fabrics containing a variety of colors, said fabrics being either "single-cloth" fabrics or "double-cloth," otherwise called "reversible," fabrics.

In weaving fabrics of the kind referred to above two of the principal systems at present in use for effecting the necessary changing of the shuttle-boxes are, first, what is known as the "barrel-motion," used only on looms commonly called "bastard" looms—that is, looms having a set of movable shuttle-boxes at one end and a fixed one at the other end of the lay—employed only for weaving single-cloth fabrics, and, second, that known as the "chain-motion," used on looms weaving both single-cloth and reversible fabrics, commonly called "pick-and-pick" looms—that is, looms having a set of movable shuttle-boxes at each end of the lay. In the first system the principal part of the mechanism is a perforated barrel, said barrel-motion being unsuitable for weaving reversible fabrics for the reason that the threads of weft of each face must be woven alternately, requiring the employment of a pick-and-pick loom. It has therefore been customary hitherto when weaving reversible fabrics (as the best-known method) to employ the second system, in which a pattern-chain, lags, or cards (but for the purposes of this description I refer only to the chain) are used, (of which there are different styles of construction,) containing one link for every weft-thread of the pattern to be woven, and as there are some patterns having as many as, say, one thousand such picks or threads of weft it has required a pattern-chain having a like number of links to operate said picks. It has been found in practice (except where the patterns were very small) that the length, weight, and cost of pattern-chain are serious drawbacks. It is also well known that said pattern-chain is impracticable or unsuitable for the weaving of fabrics when the patterns are large on account of the length of the chain, cost, manipulation, and motive power necessary to operate it. The object of my invention is to obviate this objection by dispensing with said pattern-chain and by combining and using both the said motions upon one and the same loom in such a manner that (within reasonable limits) any kind of pattern of any textile fabric or any number of colors can be woven on any kind of loom of this type, either bastard or pick-and-pick. I attain this by the use of a perforated barrel similar to that referred to in combination with a novel arrangement of clutches, levers, rods, and star-wheels and a short chain of the same construction as said pattern-chain, containing one link for every change in the color in the case of single-cloth and two links for every change of color in reversible or double-cloth fabrics if the pattern contains a variety of colors, but if it consists of only two colors then a chain containing only four links is all that is required. In the case of single cloth it matters not how many picks or changes in checking there may be in a full repeat of the pattern, and three links in the case of reversible if the pattern has two colors on one side and one color on the other. By this combination I obtain the same motions of the shuttle-boxes which would formerly only be obtained by the use of a long pattern-chain consisting of one link for each thread of weft in the pattern.

In working the present pattern-chain system it is necessary to reconstruct the pattern-chain for every change of pattern, which operation entails considerable time and labor, whereas the use of my invention will save a considerable part of this expense, as all the change then necessary is the inserting of wefting-pegs on the pattern-barrel at intervals regulated by the design of the pattern to be woven and the construction or rearrangement of a short chain, consisting at most of one or two links for each change of color instead of one link for each pick or thread of weft in the pattern, as heretofore. Thus if the pattern contained, say, one thousand threads and thirty changes of color it will be obvious that by the use of my invention an enormous saving of time and labor will be effected, as only thirty links of the pattern-chain and fifteen pegs inserted in the barrel would be necessary to operate the shuttle-box mechanism if the fabric was single cloth and the pattern turned back in the center of repeat. If the pattern contained few colors, say two, three, or four, the pattern-barrel could be so pegged as to reduce the length of the pattern-chain to less than one link for each change in the checking, but as the patterns are so various in style it is impossible to say how few links may be needed. The operator who employs my invention having the pattern before him which he desires to weave would easily find the simplest manner to manipulate it. The pattern-chain is thus operated through suitable mechanism from the pattern-barrel and changes the shuttle-boxes at each change in the pattern, ordinary mechanism being used between pattern-chain and shuttle-boxes.

In order that my invention and the manner in which I attach it to and manipulate it in connection with existing looms may be fully understood, I have appended drawings in which I have chosen to illustrate its application to the Knowles power-loom, but I wish it understood (and it will be easily understood by all persons versed in the manipulation of power-looms) that the same is applicable for use in connection with almost every kind of power-loom used for weaving textile fabrics. As illustrating a construction of Knowles loom, I may refer to Patent No. 134,992, dated January 21, 1873. As said looms may be of various constructions, I wish it further to be understood that I do not bind myself to the manner herewith shown of connecting my invention to the Knowles loom or the gear used for said purpose. A different arrangement of applying or connecting it may be required or a different gearing or mechanism may be used to impart motion to the pattern-barrel, clutches, or pattern-chain without in any way departing from the essential features of my invention.

Figure 1 is an end elevation. Fig. 2 is a rear view of loom with front view of clutches and connections to pattern-barrel. Fig. 3 is a plan view of same. Fig. 4 is a detail view of levers and cranks for actuating clutch mechanism for reversing the pattern-barrel. Fig. 5 is a view of the steadying-wheel and lever. Fig. 6 is a perspective view of a detail part, and Figs. 6$^a$ and 6$^b$ are diagrams showing this part in its two positions. Figs. 7, 8, 9, and 10 are diagrams, and Figs. 11 and 12 are detail views, of the pattern-chain and operating mechanism as applied to a Knowles jacquard. Fig. 13 is a view of part of the pattern-chain drawn to an enlarged scale.

Referring to Figs. 1, 2, and 3, a perforated barrel 1, having a series of holes arranged at equal distances from each other and in the form of a spiral round its circumference, is fixed upon a shaft 2, mounted in suitable bearings in frames 3 and 4, said frames being placed in a suitable position on or near the frame of the loom. On the shaft 2 is also fixed a spur-wheel 5, which gears with a pinion 6, fixed on the end of a screw-shaft 7, mounted in bearings in the frames 3 and 4. A lever 8, having an internally-screwed boss 9, is mounted on the screwed shaft 7, the arm of said lever entering a slot 10 in a plate 11. A projection 12 is on the under side of the lever 8, resting on the circumference of the barrel 1.

The plate 11 is mounted on sliding rods 13 13 and is free to move vertically in the bearings 14 in the frames 3 and 4. A connecting-rod 15 is hinged to the plate 11, and at its lower end is connected with the lever 16, mounted in a bracket 17. This lever at its other end is connected by means of a rod 18 to the end of the bell-crank 19, mounted on a stud 20 in the frame of the loom. The bell-crank then actuates a bar 21, to which are jointed two clutch-levers 22 and 23, working on studs fixed on the frame of the loom. These clutch-levers are arranged to actuate two clutches 24 and 25, fixed to slide on shaft 26, which shaft is mounted in journals formed on the frame. The clutches 24 and 25 have each a pin 29 and 30 fixed on their faces, which pins engage with and are free to slide through holes in their corresponding disks 27 and 28, fixed on the shaft 26. When either of the pins are pushed through their disks by the action of the clutch-levers 22 and 23, they come into gear with the notches or teeth 31 of the star-wheel 32, fixed on a shaft 33, and communicate an intermittent motion to said shaft. The action of the clutch-levers only permit one pin to be projecting at a time. On this shaft 33 is fixed a chain-wheel 34, which carries the pattern-chain 35, and a steadying-wheel 36, containing the same number of notches as there are teeth in the star-wheel. A lever 37 has a projection 38 on its under side which rests in the notches of the steadying-wheel 36. At each movement of the shaft 33 the projection on the lever falls into a notch of the steadying-wheel and is held in by means of the spiral spring 39 for the purpose of bringing the pattern-chain to rest in a definite position.

Motion is obtained for the mechanism from the crank-shaft 40 of the loom by means of a miter-wheel 41 on said shaft gearing into a like wheel 42 on an upright shaft 43. On the other end of shaft 43 a similar miter-wheel 44 is fixed and gears with miter-wheel 45 (or 46 when reversing) on shaft 47, which again by means of miter-wheels 48 and 49 gears into shaft 50, and this again is geared by miters 51 and 52 with clutch-shaft 26. At the outer end of this shaft a miter 53 gears into a like miter-wheel 54 on vertical shaft 55, which at its lower end gears, by means of miter-wheels 56 and 57, with a shaft 58, carried in bearings on the rails of the frames 3 and 4. On this shaft are fixed two disks 59 and 60 and two clutches 61 and 62, with pins 63 and 64, fixed in their faces, which pins engage with and are free to slide through holes in the disks 59 and 60 and project beyond the faces of said disks. When either of these pins are pushed through their disks 59 and 60, they come into gear with notches or teeth 65 of a star-wheel 66, fixed on shaft 67, carried on bearings on frame 3. On this shaft 67 is fixed a spur-pinion 68, gearing through an intermediate wheel 69 on stud 70 with spur-wheel 71, fixed on shaft 2, in such a manner that for every revolution of the crank-shaft the circumference of the barrel moves round through the distance of one hole.

The lower end of the lever 8 lies in a gap in the carrier 72, which is free to slide along the square shaft 74, carried in bearings in frames 3 and 4. When it becomes necessary to reverse the direction of the perforated barrel or when the end of barrel has been reached, pins 75 are inserted at suitable points, which pins, by the rotation of the barrel, come into contact with the tails 76 or 77 of the carrier 72, which, with the aid of spiral spring 78, throws the crank $79^a$, fixed upon tilting crank 74, to the position shown by dotted lines on Fig. 6. Arm $79^a$ of crank 79 is connected by rod 80, Fig. 4, to lower arm of bell-crank 81, hinged on a stud 82 in frame 3, the upper end of which actuates a bar 83, connected by the clutch-levers 84 and 85, Figs. 1 and 3, for operating the clutches 61 and 62, so that when the position of the tilting crank 74 is reversed the clutch which was in gear with star-wheel 66 is withdrawn and the other clutch put into gear, the pin of which, falling with each revolution into the notches on the opposite side of said star-wheel, reverses the direction of the barrel. The levers are so adjusted that only one of the clutches can be in gear at the same time.

The holes in the barrel 1 are for the reception of wefting-pegs 178, Fig. 1, similar to those commonly used and of such a length or lengths as to lift the lever 8 and plate 11 to a sufficient height when one of the said pegs comes into contact with the projection 12 on lever 8, so that one or other of the clutches shall fall into gear with the star-wheel or both clutches put out of gear in the manner hereinafter to be described, the screw being made of such a pitch and the barrel and screw being so adjusted that the motion communicated by the spur-wheel 5 on the barrel 1 to the pinion 6 on the screw 7 and by the said screw to the screwed boss 9 of the lever 8 so that the lever will move laterally and over the spiral line of holes in the barrel 1.

The pattern-chain 35 is controlled from the barrel 1 by the manner in which said barrel is pegged. There is no fixed rule as to how the barrel shall be pegged, as these pegs must be placed in such order and in such quantities as will govern the checking of the pattern and the fabric to be woven; which in some cases may require a peg to be inserted at each place in the barrel when a change is required, or it may be one hole pegged and left empty alternately, or it may be peg three and miss three, or there may be two sizes of pegs used, the highest ones above the barrel to indicate the changes and the lower ones to keep the clutches out of gear to enable the pattern-chain to remain at rest. In whatever order the pegs may be placed in barrel 1, each of them as they come round through the rotation of the barrel comes into contact with the projection 12 on the lever 8, the lever is raised, and thus raising the slotted plate 11 and the rod 15 hinged to it, would raise that end of the lever 16 to which the rod 15 is connected and lower the opposite end. This end being connected by means of the rod 18 to the bell-crank 19, the horizontal arm of the bell-crank would be lowered and the other end, actuating the bar 21, to which the clutch-levers are attached, would cause the pin 29 to be withdrawn into the disk 27 and the pin 30 to project. The projecting pin 30 comes into contact with the teeth or notches 31 of the star-wheel 32, which preferably contains six teeth and causes it to rotate one-sixth of a revolution. The barrel will now be made to revolve through the space of one hole, and if no wefting-pegs have been placed in next hole which comes below the projection 12 lever 8 will be allowed to fall back to its original position, resting on the barrel, which will cause all the motions before mentioned to be reversed, clutch 25 being taken out of gear with star-wheel 32 and clutch 24 put onto gear, the pin of which falls into the notch on opposite side of star-wheel 25, thus causing the star-wheel and pattern-chain to be brought back to their former position. These motions are repeated for every wefting-peg placed in the barrel alternately with an empty hole. When a change of color is desired, either three pegs are inserted in consecutive holes, or three consecutive holes are left empty, which permits of one or another of the two clutches remaining in gear during three picks and causing the star-wheel and pattern-chain cylinder to be rotated one-third of a revolution, and thus bring another pair of links of the pattern-chain into operation.

The operation just described refers only to the weaving of double or reversible cloth and single-cloth fabrics with single picks in the pattern but if the fabric be single cloth, with no less than two picks at any place in the pattern and containing a variety of colors, only one clutch and one clutch-lever is used, the other being disconnected. Barrel 1 is for this class of fabric pegged one hole for each change of color at the points corresponding to the places in the pattern where the changes of the colors occur. When this peg comes below the projection 12 on lever 8, the same action takes place as already described. The clutch-pin coming into gear with the star-wheel rotates it one-sixth of a revolution, and a fresh link of the pattern-chain is brought into operation in the manner already described. With the next revolution of the crank-shaft the lever 8 falls to its former position onto the surface of the barrel, and the pattern-chain remains at rest till the required number of picks are woven, when the next peg shall be reached. Therefore if there are twenty changes in the color or checking a pattern-chain of only twenty links is used and the insertion (if the pattern turns back in the center of repeat) of only ten wefting-pegs in the barrel. These will operate any number of picks, limited only by the quantity of holes in the barrel.

If the loom to which my invention is applied is an ordinary or bastard loom, then the capacity of the barrel is doubled, as two picks are operated from each hole or wefting-peg, the barrel moving through one hole for every two revolutions of the crank-shaft of the loom. If the complete pattern or any considerable portion of it consists of only two colors, the holes of the barrel are pegged alternately and both clutches used as for reversible cloths. By this arrangement four links of the pattern-chain only are needed to operate the whole or two colored parts of said style of pattern, although there may be a great number of changes in the checking. Patterns with three colors can be woven with six links of the pattern-chain in the same manner.

My invention being connected to the jacquard of the well-known "Knowles" loom by means of bevel-gearing 48 and 49 and shafts 47 and 50, consequently moves in unison with it, so that when it is necessary to turn back the jacquard (which is done in the ordinary manner adopted on said loom) for the purpose of picking out imperfect work or finding the pick all the parts of my invention are likewise reversed, so that pattern-barrel 1 and pattern-chain, with no attention whatever from the operator, are always kept in time with jacquard, no matter which way or how many picks the jacquard is turned.

That the working of my invention may be thoroughly understood I will now describe the manner in which it is combined with an ordinary mechanism between the pattern-chain and the shuttle-boxes for controlling the movement of the shuttle-box, which, however, forms no part of this invention, and for this purpose I will assume that I am applying my invention to the working of a Knowles jacquard. The pattern-chain, Fig. 13, consists of two flat link chains 101 and 102, joined by a long bolt or pin 103. On this bolt are fitted pulleys 104 and bushes 105, all as is required by the design of the pattern to be woven. By the working of my invention before mentioned these bolts are brought to rest in a definite position by the action of the star-wheel and clutch mechanism and the steadying-wheel.

Referring to Figs. 11 and 12, when one of the pulleys 104 is brought into position below the lever 86, hinged at 87, it will raise said lever and with it the spur-wheel 88, which is carried in bearings 89 in the said lever, till the spur-wheel 88 comes into gear with the spur-segment 90, revolving in the direction of the arrow. The spur-wheel will then revolve until it comes to rest with that part of the circumference where the teeth have been cut away in such a position that the revolving segment will be out of gear with spur-wheel. A lever 91 or 92 is hinged to the spur-wheel, and when the wheel is made to revolve it is brought into position, as shown in Fig. 12. I will now suppose that the next link of the chain is brought into position and that on the part corresponding to this lever a bush is now placed instead of a pulley, as formerly. The support for the lever being now removed, it will fall into its former position and the spur-wheel 88 will now come into gear with the bottom segment 93, revolving in the direction of the arrow, and the lever will be brought back to its former position, the wheel, as in the former case, coming to rest in a position to allow of the bottom segment-wheel revolving freely.

I will now refer to diagrams 7, 8, 9, and 10, in which there are four sets of these levers combined with and connected by means of spur-wheels, which are raised or lowered into gear with either the top or bottom of the half-tooth segments, and as said segments revolve in opposite directions said levers are drawn forward or pushed back to their original position, as there are bushes or pulleys fixed on the spindles or bolts of the pattern-chain, in the manner described. One pair operates four shuttle-boxes at one side and the other pair operates four shuttle-boxes at the other side of the loom. Taking one pair of levers to illustrate the action at their outer end, one of the pair 91 is jointed to a lever 94, working on a fulcrum 95 and carrying at its opposite end a chain-wheel 96, the other lever 92 being jointed to a lever 97, working on a fulcrum at 98, the chain 100, which is connected direct to the shuttle-box, being attached to it at 99. Fig. 7 shows the position of the lever when the top of the shuttle-box is in working position, bushes on the pattern-chain being in position beneath both levers. Fig. 8 shows the position of the lever when the second shuttle-box is in working position, a bush on pattern-chain being under lever 86, connected with lever 91, and a pull on pattern-chain being in position under lever 86, connected with lever 92. Fig. 9 shows the position of the lever when the third shuttle-box is in working position, a pulley or pattern-chain being under lever 86, connected with lever 91, and a bush on same chain being in position under lever 86, connected with lever 92. Fig. 10 shows the position of the lever when the fourth shuttle-box is in working position, pulleys on the pattern-chain being in position beneath both levers.

It will be observed that the raising of shuttle-box into position is due to the fact that lever 94 by its movement takes up twice the length of chain which the lever 97 will take up by its movement. When the two levers 94 and 97 combine, they will take up three times the length of chain the lever 97 will take up, the action of the other pair of levers for working the box on the opposite side being exactly similar to that just described.

I claim as my invention—

1. Shuttle-box-changing mechanism, comprising a pattern-barrel, having spirally-arranged holes for the pegs, a chain and a chain-wheel and shaft therefor, in combination with a system of levers actuated by the pattern-barrel, a rotating shaft and double-clutch mechanism adapted to connect the rotating shaft and chain-wheel shaft to turn the latter first in one direction and then in the other, the said clutch mechanism being actuated by the said levers, substantially as set forth.

2. Shuttle-box-changing mechanism comprising a pattern-barrel, a chain and a chain-wheel and shaft therefor, in combination with a system of levers actuated by the pattern-barrel, a rotating shaft, clutch mechanism actuated by the said levers to connect the rotating shaft and chain-wheel shaft, reversible driving-gear for the pattern-barrel and means for automatically reversing the pattern-barrel when the end of the barrel or the end of the pegging has been reached, substantially as set forth.

In testimony whereof I have signed my name to this specification in the presence of two subscribing witnesses.

BENJAMIN SMITH.

Witnesses:
JOHN SIME,
DONALD YOUNG.